P. PIRRO.
CLUTCH.
APPLICATION FILED MAY 16, 1919.

1,324,466.

Patented Dec. 9, 1919.

INVENTOR
Paul Pirro
BY
Walton Harrison,
ATTORNEY.

UNITED STATES PATENT OFFICE.

PAUL PIRRO, OF NEW YORK, N. Y.

CLUTCH.

1,324,466.      Specification of Letters Patent.      Patented Dec. 9, 1919.

Application filed May 16, 1919. Serial No. 297,676.

*To all whom it may concern:*

Be it known that I, PAUL PIRRO, a citizen of the United States, residing at New York city, county of New York, and State of New York, have invented certain new and useful Improvements in Clutches, of which the following is a full, clear, and concise description.

My invention relates to clutches, and admits of general use but is of peculiar value for the purpose of connecting and disconnecting mechanical members of small size and delicate construction.

More particularly stated, I seek to produce a clutch made in two principal parts, adapted to be used upon jewelry, and especially upon earrings.

Reference is made to the accompanying drawing forming a part of this specification, and in which like letters indicate like parts throughout the several figures.

Figure 1:
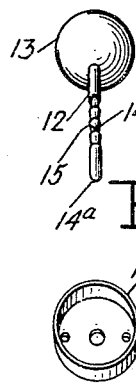
Figure 1 is a perspective of the clutch pin, carrying in this instance a spherical ornament forming the body member of an earring.
Figure 2:
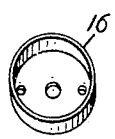
Fig. 2 is a perspective of the barrel of the clutch.

A clutch pin is shown at 12, and carries an ornament 13. This ornament may be of any desired shape, but in this instance is spherical and constitutes the body portion of the earring.

The pin 12 is provided with frusto-conical portions 14, bounded by annular shoulders 15.

The clutch pin 12, with or without the ornament 13 constitutes one of the two principal parts of the clutch, the other one being made up of the rest of the mechanism shown.

A barrel is shown at 16, and is used for holding various other parts.

A housing cap 17 is carried by the barrel, to which it is secured by screws 18. The housing cap 17 and the barrel 16 together serve as a housing.

The housing cap 17 carries a small post 19 and a massive flange 20, this flange having a general C shape. The post 19 and flange 20 serve to support the main spring 21, so as to allow it a limited amount of movement. The flange 20, because of its massive form, serves also to afford a good anchorage for the screws 18.

The main spring 21 is in this instance made in a single integral member of steel, and has the general form of a split ring. It is provided, however, with a pair of centrally disposed leaves 22, which are normally close together, but can be forced slightly apart, the spring thus being placed under tension.

The two leaves 22 are cut away to form a pair of hemispherical notches 23 and a pair of semi-conical notches 24. The notches 23 together serve practically as a hole through which the post 19 extends. The notches 24 together constitute an aperture through which the body of the clutch pin 12 may be thrust, so as to force the leaves 22 slightly apart, thus placing the main spring under tension. This purpose is facilitated by providing the clutch pin with a point 14ª.

The leaves 22 are provided with lugs 25, of which there are two, one upon each leaf. Each lug 25 is of arcuate form and is integral with the leaf carrying it.

Figure 3:
Fig. 3 is a perspective of the tubular stem forming a part of the clutch.
Figure 4:
Fig. 4 is a perspective of the tensioning spring.
Figure 5:
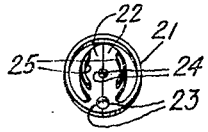
Fig. 5 is a perspective of the main spring.
Figure 6:
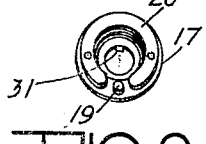
Fig. 6 is a perspective of the housing cap.
Figure 7:
Fig. 7 is a perspective of the knob for controlling various movable parts of the clutch.

A tubular stem 26, shown in detail in Fig. 3, is provided at one of its ends with a flange 27, secured rigidly upon it and preferably integral with it. This flange has a general elliptical form, and is located between the lugs 25 and is movable relatively thereto.

The tubular stem 26 extends axially through a knob 28, to which it is secured rigidly in any suitable manner, preferably by first making it to fit tightly and then subjecting it to pressure so as to form a rivet.

By grasping the knob 28 by hand and turning it slightly, so as to rock or turn the tubular stem 26, the elliptical flange 27 can be forced against the lugs 25, so as to force them apart, thus moving the leaves 22 apart and placing the main spring 21 under tension. This action releases the leaves 22 from engagement with the clutch pin 12, if the latter happens to be in position, that is, in engagement with the leaves. Thus in practice a single rocking movement of the knob causes a disengagement of the clutch.

A leaf spring is shown at 29, and is elongated so as to have a general elliptical form. It is provided with a hole 30, through which the tubular stem 26 extends. The leaf spring 29 is bent or formed so as to be convex upon one face and concave upon the other. The convex face of the spring is toward the left according to Figs. 8 and 9.

Figure 9:
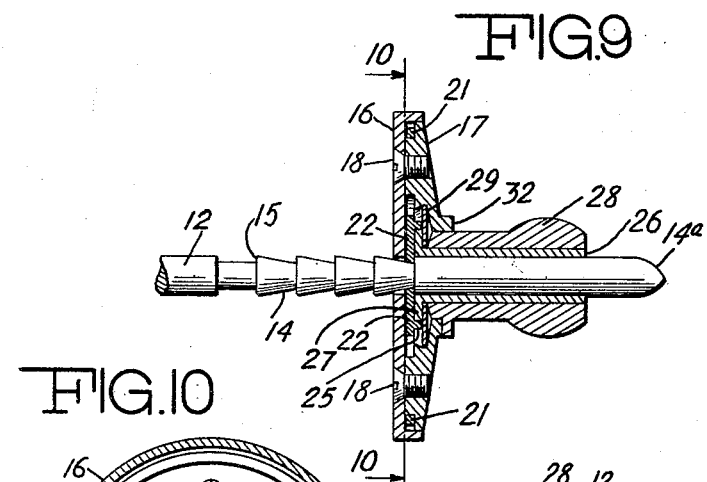
Fig. 9 is a substantially central vertical section through the clutch.
Figure 10:
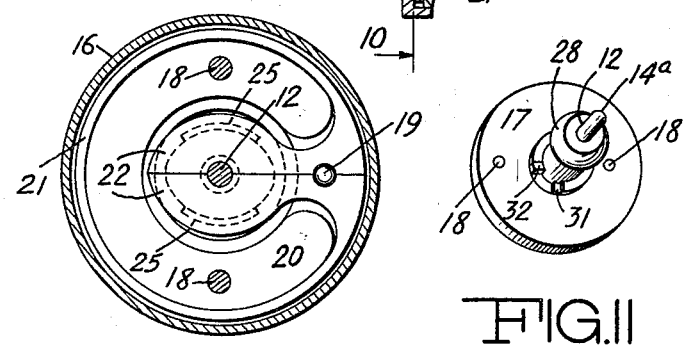
Fig. 10 is a section on the line 10—10 of Fig. 9, looking in the direction indicated by the arrows.

The purpose of the leaf spring is to maintain the main spring in position, by pressing aganst it constantly and gently, and is also to press the knob 28 gently toward the left according to Fig. 9, which it does by pressing against the flange 27 of the tubular stem 26.

The knob 28 carries a projection 30 extending radially from it. The housing cap 17 is provided with two lugs 31, 32, the lug 32 being more prominent than the lug 31, as may be understood from Fig. 11.

Figure 11:
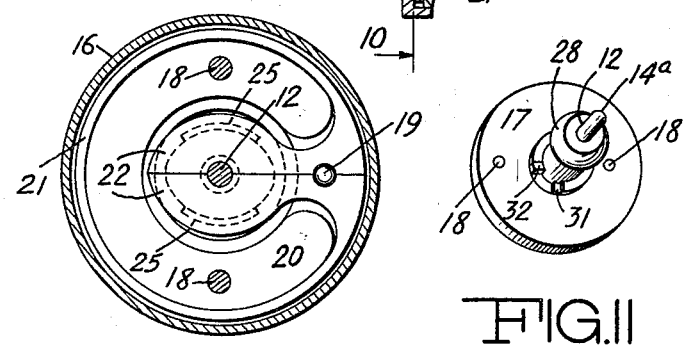
Fig. 11 is a perspective of the clutch mechanism as assembled.

If the knob 26 be pulled to the right according to Fig. 9, and then turned in a contra-clockwise direction according to Fig. 11, the lug 30 can be caused to snap down on the lug 31. This done, the knob is locked so that it can not be turned except by drawing it out a little.

If, however, the knob be drawn out a little as just suggested, and then turned or rocked in a clockwise direction according to Fig. 11, the lug 30 lodges against the lug 32. Thus the rocking movement of the knob is limited.

Figure 8:
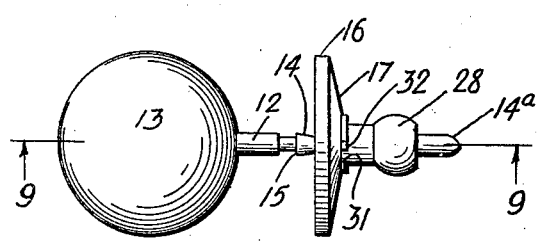
Fig. 8 is a side elevation of the clutch as used upon the earring.

The operation of my device is as follows:

The parts being assembled and arranged as shown and above described, the clutch pin 12 is simply thrust through the barrel 16 and parts carried thereby, as indicated in Figs. 8 and 9.

The leaves 22 yield slightly, so as to permit the pin to be thrust through the notches 24, as above described. These notches then encircle the pin, at a point adjacent to some one of the shoulders 15, so that the pin can not be withdrawn, except by pulling upon the knob and turning the same as hereinbefore pointed out.

When the clutch is used upon an earring, it adapts itself to ears of different thickness, the pin 12 being thrust through the ear to a greater or a lesser extent. Thus one, two, three or more of the frusto-conical members 14 are passed between the leaves 22, depending upon the thickness of the ear.

I do not limit myself to the precise construction shown, as variations may be made therefrom without departing from the spirit of my invention.

I claim—

1. In a clutch the combination of a clutch pin, a spring having the form of a split ring, a pair of leaves carried by said spring and controllable by the tension of said spring for the purpose of clasping said clutch pin, a sleeve located adjacent said spring and said leaves and so disposed that said clutch pin may be thrust between said leaves and into said sleeve, a knob mounted upon said sleeve to be grasped by the operator in order to enable him to rock said sleeve relatively to said sleeve and said spring, and means controllable by the rocking movement of said sleeve for disengaging said sleeve from said clutch pin.

2. In a clutch the combination of a clutch pin, a barrel provided with an opening into which said clutch pin may be thrust, a spring housed within said barrel, a pair of leaves carried by said spring and controllable by the tension thereof for clasping said clutch pin, lugs mounted upon said leaves and extending therefrom, a sleeve extending into said barrel and having a limited rocking movement relatively thereto, and an actuating member carried by said sleeve and provided with a portion for engaging said lugs, in order to move said leaves apart and thus unclasp said leaves from said clutch pin.

PAUL PIRRO.